(12) United States Patent
Li

(10) Patent No.: US 6,202,034 B1
(45) Date of Patent: Mar. 13, 2001

(54) ULTRASONIC RANGING SYSTEM AND METHOD FOR IMPROVING ACCURACY THEREOF

(75) Inventor: Songnian Li, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/237,851

(22) Filed: Jan. 27, 1999

(51) Int. Cl.$^7$ ................................................ G01S 15/00
(52) U.S. Cl. ........................... 702/159; 367/87; 367/89; 367/99; 73/597; 73/625
(58) Field of Search ................................. 702/159, 142, 702/147, 149, 39; 367/87–91, 97–99, 101, 127, 178; 73/597, 602, 625, 628, 632; 340/384.71, 384.72, 384.73

(56) References Cited

U.S. PATENT DOCUMENTS

| | | | |
|---|---|---|---|
| 4,280,580 | * 7/1981 | Wojcik | 340/661 |
| 4,315,325 | * 2/1982 | Blades | 367/98 |
| 4,545,250 | * 10/1985 | Miwa | 73/602 |
| 4,630,482 | * 12/1986 | Traina | 73/597 |
| 4,674,057 | * 6/1987 | Caughman et al. | 73/625 |
| 4,701,893 | * 10/1987 | Muller et al. | 367/87 |
| 5,365,442 | * 11/1994 | Schmidt | 701/50 |

* cited by examiner

Primary Examiner—Marc S. Hoff
Assistant Examiner—Bryan Bui
(74) Attorney, Agent, or Firm—Jimmy L. Funke

(57) ABSTRACT

An ultrasonic ranging system and method for detecting the presence of and distance to a target using ultrasonic sound waves generated by an ultrasonic transducer with reduced audible noise. Electrical ultrasonic signal pulses are modulated according to a smooth modulation envelope and a transducer drive signal is generated from the modulated signal pulses. The transducer drive signal drives an ultrasonic transducer which generates ultrasonic sound waves for transmission in a desired path, and further receives ultrasonic sound waves reflected from targets in the transmission path. The received ultrasonic sound waves are converted to an electrical signal that is processed by a processor to provide time and distance information to the target. The distance information is computed by using a middle time value for the transmitted and received signals.

13 Claims, 4 Drawing Sheets

ULTRASONIC RANGING SYSTEM AND METHOD FOR IMPROVING ACCURACY THEREOF

BACKGROUND OF THE INVENTION

The present invention generally relates to ultrasonic ranging and, more particularly, to an ultrasonic ranging system and method for improving the accuracy of an ultrasonic transducer, especially for use in a vehicle.

Ultrasonic sensing techniques have become widely acceptable for use in ranging systems for determining the presence of and distance to a target object. In a conventional ultrasonic ranging system, an ultrasonic transducer is employed which converts electrical signal pulses into mechanical motion. In turn, the mechanical motion creates ultrasonic sound waves that are transmitted through the atmosphere in a desired direction. Provided there is a target in its path, the ultrasonic sound waves reflect off of the target and the reflected sound waves travel back to the ultrasonic transducer. The reflected sound waves, also referred to as the echo waves, mechanically deflect the ultrasonic transducer and, in response, a low voltage signal is generated. Since the speed of travel of the sound waves remains relatively fixed, the distance to the target is determined by measuring the time period between the transmitted and received signal pulses, and computing the distance as a function of the time period and the sound wave speed.

In the past, conventional ultrasonic ranging systems employed a series of gated signal pulses of uniform amplitude to drive the ultrasonic transducer. In order to compute the distance to a target, the conventional ultrasonic ranging system measured the time period between the beginning of the transmitted drive signal and the beginning of the received echo signal. The time period measurement between the transmitted and received signals was typically multiplied by one-half the speed of travel of the sound waves to compute the measured distance to the target. The conventional distance measurement approach has drawbacks in that the accuracy of the ultrasonic distance sensing system can be influenced to a large extent by several factors such as the geometry and the material of the target object, as well as variations in the transmit signal. Accordingly, conventional ultrasonic ranging systems are capable of providing inaccurate distance measurement.

Accordingly, it is one object of the present invention to provide for a method of effectively enhancing the accuracy of distance measurement with an ultrasonic ranging system. It is another object of the present invention to provide for an ultrasonic ranging system with enhanced accuracy for determining distance to a target. Yet, it is a further object of the present invention to provide for an enhanced accuracy ultrasonic ranging system for use in the passenger compartment of a vehicle.

SUMMARY OF THE INVENTION

In accordance with the teachings of the present invention, an ultrasonic ranging system and method are provided for producing accurate distance measurement with an ultrasonic transducer. The ultrasonic ranging system includes an ultrasonic transducer for converting an electrical drive signal to ultrasonic sound waves and transmitting the sound waves in a desired transmission path. The ultrasonic transducer further receives ultrasonic sound waves reflected from a target in the transmission path and converts the received reflected sound waves to an electrical signal. The ultrasonic ranging system includes a processor for receiving the transmitted electrical drive signal and the received reflected electrical signal. The processor determines a time value at the middle of the time width of the drive signal. In addition, the processor measures the time width of the received reflected electrical signal and determines a time value at the middle of the time width of the received reflected electrical signal. The time difference between the middle time values of the received and transmitted signals is determined to provide for an overall time period measurement. The distance to the target is computed as a function of the determined time period and speed of travel of the ultrasonic sound waves.

According to the method of providing accurate distance measurement with an ultrasonic transducer according to the present invention, a transducer drive signal is generated and applied to an ultrasonic transducer. The ultrasonic transducer converts the drive signal to ultrasonic sound waves and transmits ultrasonic waves in a transmission path. The ultrasonic transducer further receives sound waves reflected from targets in the path of the transmitted sound waves and converts the received reflected sound waves to an electrical signal. A middle time value of the transmitted drive signal is determined, and a middle time value of the received reflected electrical signal is determined. The time difference between the middle time values of the transmitted and received signals is determined to provide for an overall time period. The time period is employed to determine distance to the target as a function of the speed of travel of the ultrasonic sound waves.

These and other features, advantages and objects of the present invention will be further understood and appreciated by those skilled in the art by reference to the following specification, claims and appended drawings.

This application is one of two applications filed on the same date, both commonly assigned and having similar specifications and drawings, the other application being identified as U.S. application Ser. No. 09/237,850 entitled "SYSTEM AND METHOD FOR ELIMINATING AUDIBLE NOISE FOR ULTRASONIC TRANSDUCER," to Songnian Li.

DETAILED DESCRIPTION OF THE PREFERRED EMBODIMENT

Figure 1:
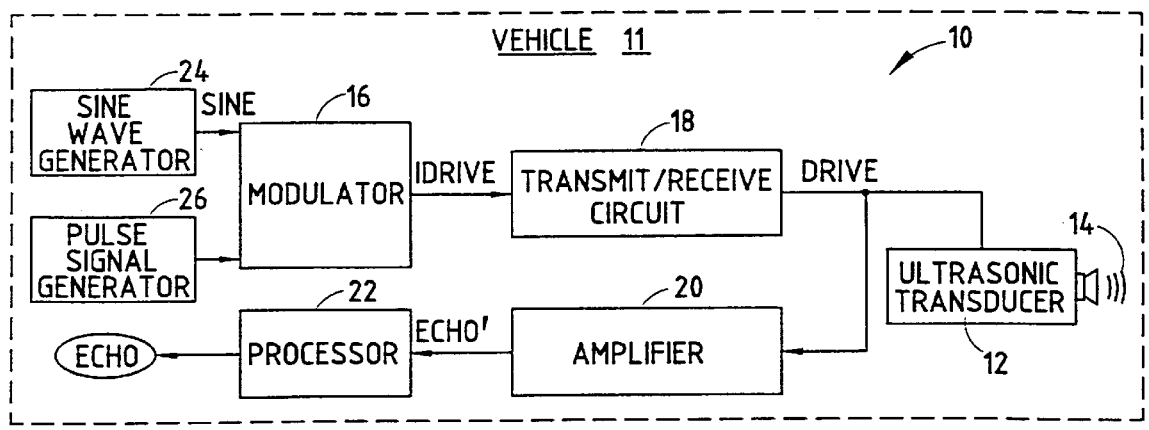
FIG. 1 is a block diagram illustrating an ultrasonic ranging system in a vehicle according to the present invention.

Referring to FIG. 1, an ultrasonic ranging system 10 is shown employed in a vehicle 11, such as in the passenger compartment of an automotive vehicle. The ultrasonic ranging system 10 is employable to detect the presence of and distance to one or more targets. For example, the ultrasonic ranging system 10 may be employed to detect the presence of a passenger seated in a vehicle, and to determine the distance to the targeted passenger from an air bag. Target detection is generally accomplished by transmitting ultrasonic sound waves in a desired direction, and receiving reflected (i.e., echo) sound waves returned from target objects located in the path of the ultrasonic sound waves. The distance measurement to the target is determined as a function of the time period between the transmitted and received sound wave signals, and the speed of the ultrasonic sound waves.

The ultrasonic ranging system 10 has an ultrasonic transducer 12, which may include a conventional type transducer such as the 7000 series electrostatic transducer which is made commercially available from Polaroid Corporation. The ultrasonic transducer 12 converts an electrical drive signal into mechanical sound motion to create ultrasonic sound waves 14 that are transmitted through the atmosphere in a desired direction. In addition, the ultrasonic transducer 12 detects those ultrasonic sound waves that are reflected from targets located in the path of the transmitted sound waves. These reflected sound waves, also referred to as echo sound waves, mechanically deflect the ultrasonic transducer 12 to generate a low voltage signal in response thereto.

Figure 3:
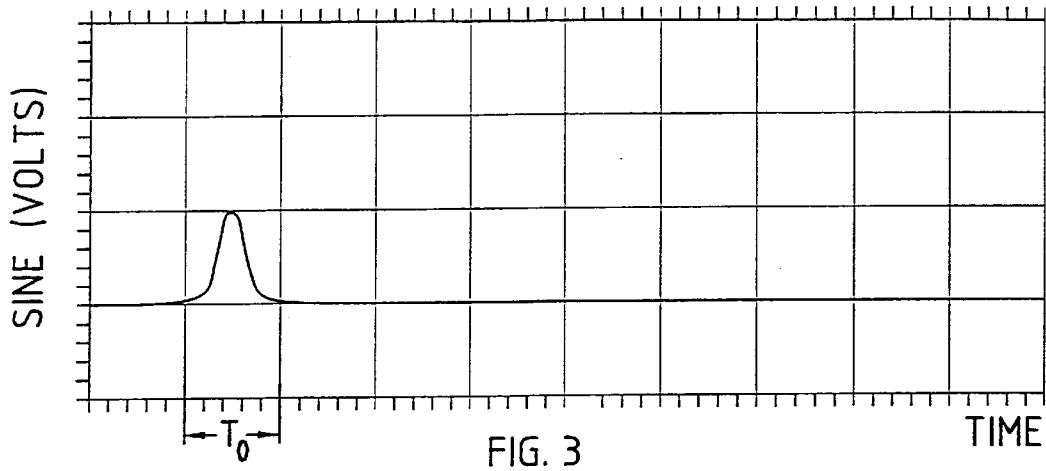
FIG. 3 is a graph illustrating a sine contoured envelope used for modulating a drive signal according to one embodiment of the present invention.
Figure 4:
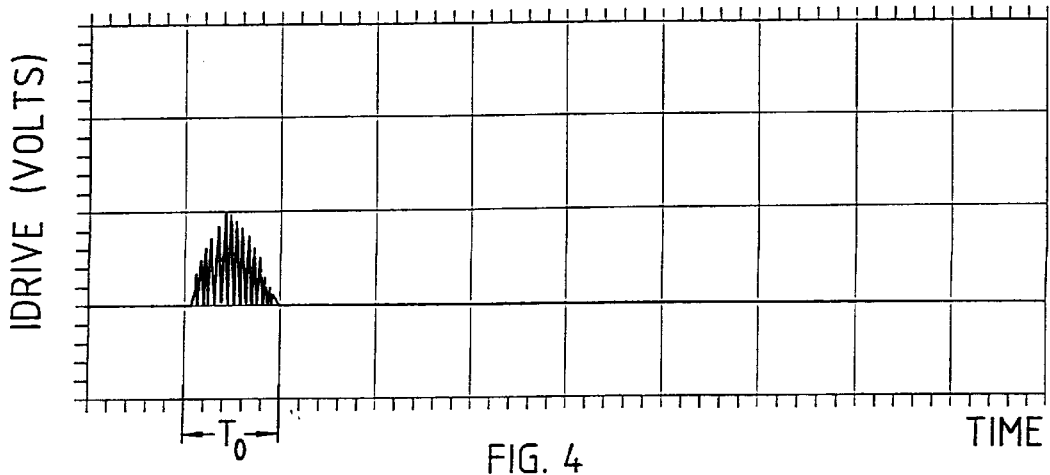
FIG. 4 is a graph illustrating a modulated drive signal according to one embodiment.

The ultrasonic ranging system 10 further includes a modulator and a transmit/receive, e.g., transceiver, circuit 18. The modulator 16 is preferably an amplitude modulator that modulates the amplitude of a carrier signal. Modulator 16 receives a pulsed electrical signal from a pulse signal generator 26 at a predetermined ultrasonic frequency, such as 50 kHz, for example. The ultrasonic frequencies generally range from 20 kHz to 400 kHz and higher, which exceeds the audible frequencies for human hearing, and therefore are generally not detectable to the human ear. The pulse signal generator 26 generates a series of signal pulses which can be in the form of a square waveform, a triangular waveform, a sinusoidal waveform, or other pulsed waveforms. In addition, the modulator 16 receives a smoothly contoured signal, such as a sine wave signal produced from a sine wave generator 24, which provides for a smooth modulation envelope. One example of a sine wave signal that may be used for the modulation envelope is shown in FIG. 3, and is referred to as the SINE signal having a time period $T_0$. Modulator 16 smoothly modulates the pulsed electrical signal within the sine wave modulation envelope to generate a smooth modulated drive signal that gradually increases from a low amplitude to a higher amplitude and back to a low amplitude as shown in FIG. 4, and is referred to as the IDRIVE signal.

According to one embodiment, the IDRIVE signal may be defined by the following equation:

$$IDRIVE = U_0 \left[ 1 + \sin\left(2\pi \frac{1}{T_0} t - \frac{\pi}{2}\right) \right] \cdot \text{pulsed waveform } [0, 1 : f]$$

$$0 \leq t \leq T_0$$

where $U_0$ is the voltage gain, which may be set to 5 volts or other suitable voltage level, and the pulsed waveform is set to an ultrasonic frequency (f) such as 50 kHz, according to one example. The time period $T_0$ is equal to the time period of the SINE modulation signal.

The transmit/receive circuit 18 receives the IDRIVE signal and generates a transmit signal for the transducer, as well as receives a reflected signal from the transducer and generates an echo signal. More particularly, the transmit/receive circuit 18 converts the IDRIVE signal to a transducer drive signal, referred to as the DRIVE signal, for driving the ultrasonic transducer 12 which, in response, generates ultrasonic sound waves for transmission therefrom.

Figure 5:
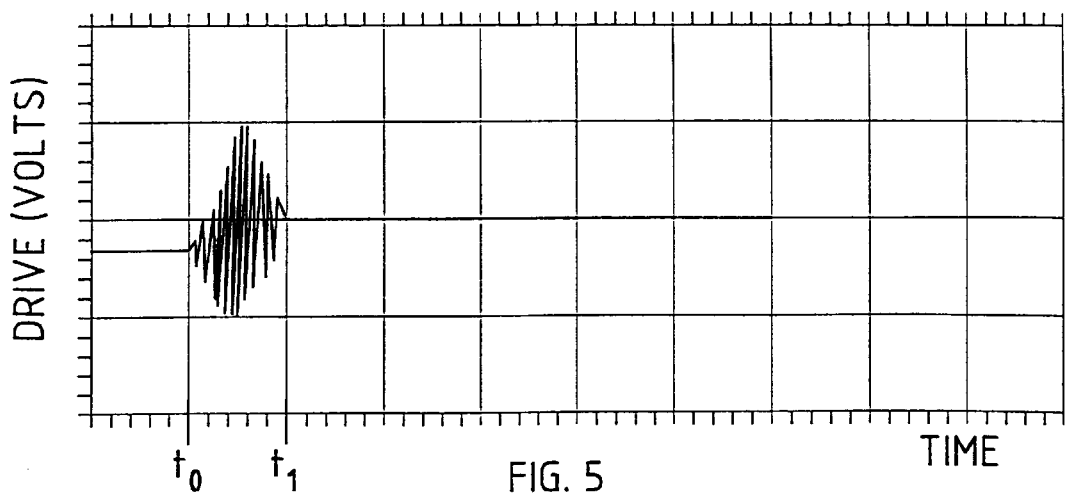
FIG. 5 is a graph illustrating a transmit drive signal that is applied as an input to the ultrasonic transducer according to the present invention.

One example of the DRIVE signal is shown in FIG. 5. As shown, the ultrasonic drive signal frequency varies in amplitude according to the sine modulation envelope so that the transducer drive signal gradually increases to a maximum amplitude to prevent the occurrence of an abrupt air acceleration in the transducer, to thereby prevent the creation of audible sound noise.

Figure 6:
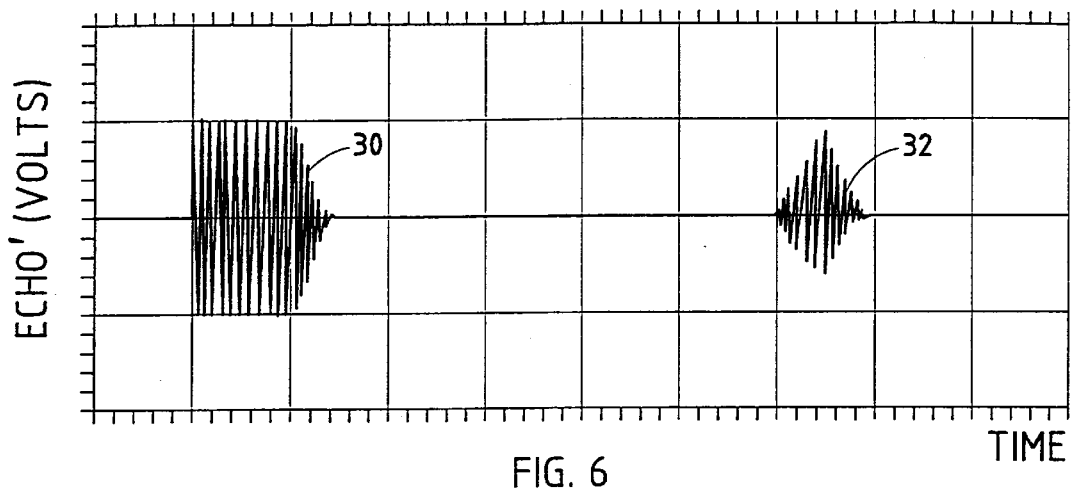
FIG. 6 is a graph illustrating an echo signal produced in response to reflected ultrasonic sound waves received by the ultrasonic transducer.
Figure 7:
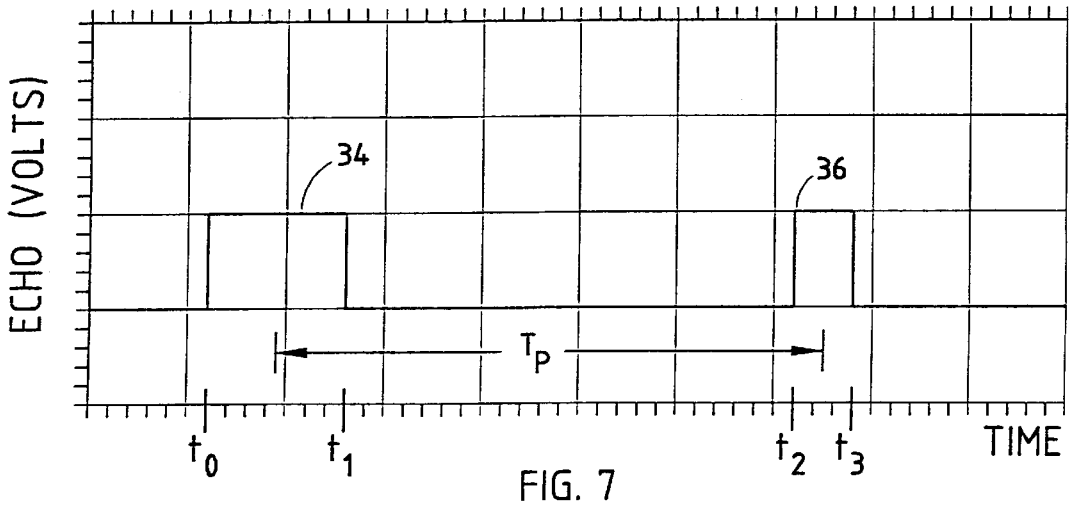
FIG. 7 is a graph illustrating an output echo signal produced by the ultrasonic ranging system of the present invention.

The transmit/receive circuit 18 receives the electrical signal produced by the ultrasonic transducer 12 in response to the received reflected sound waves. The ultrasonic ranging system 10 further includes an amplifier 20 for amplifying the echo signal received from transmit/receive signal 18 to produce an amplified signal, referred to as the ECHO' signal. Referring to FIG. 6, one example of the ECHO' signal is illustrated therein. It should be appreciated that the transmit/receive circuit 18 output as amplified by amplifier 20 provides the ECHO' signal as shown by signal 32, in addition to signal 30 which represents the response of the transmit/receive circuit 18 to the transmit DRIVE signal. Accordingly, both the DRIVE and ECHO' signals 30 and 32 are applied to a processor 22. The processor 22 receives and processes the signals 30 and 32 to produce an output ECHO signal, such as is shown in FIG. 7. In doing so, the ECHO' signal is converted to digital logic signal to provide the ECHO signal in which a logic high represents the presence of such a signal. Signals 34 and 36 correspond to transmitted drive signal 30 and received echo signal 32, respectively. Given the ECHO signal with information on both the transmitted drive signal, represented by signal 34, and the received reflected signal, represented by signal 36, processor 22 may process the DRIVE and ECHO signals to produce time and distance information as explained herein. It should be appreciated that the ultrasonic transducer 12, modulator 16, transmit/receive circuit 18, amplifier 20, processor 22, sine wave generator 24 and pulse signal generator 26 may include conventional off-the-shelf electronic devices that are commercially available.

Figure 2:
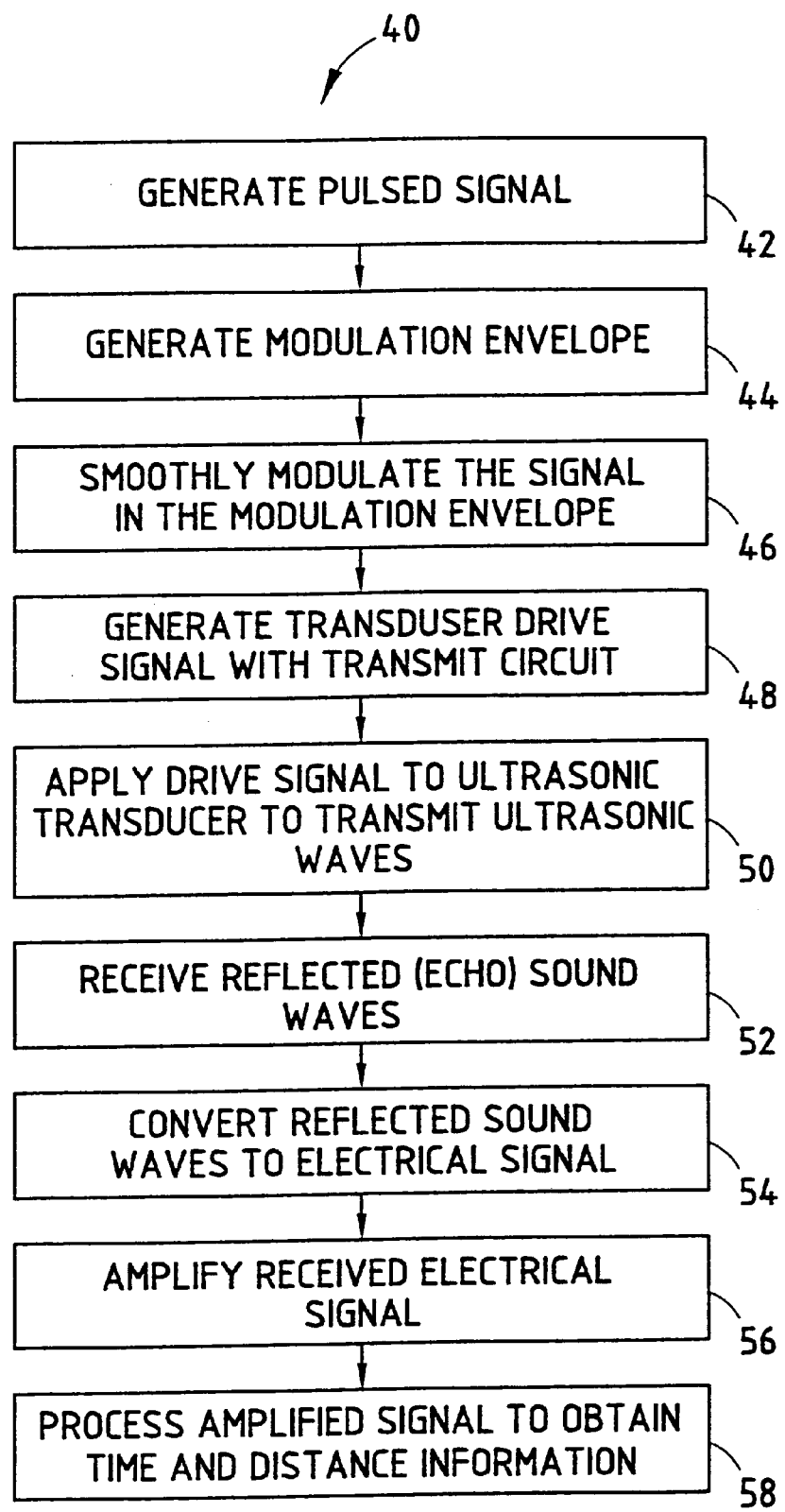
FIG. 2 is a flow diagram illustrating a method of operating an ultrasonic transducer with reduced audible noise according to the present invention.

Referring to FIG. 2, illustrated therein is a methodology 40 for driving the ultrasonic transducer 12 and operating the ultrasonic ranging system 10 in a manner that reduces or eliminates audible noise associated with the ultrasonic transducer 12. Methodology 40 includes step 42 of generating a pulsed signal at a predetermined ultrasonic frequency with the pulse signal generator 26. In step 44, a smoothly contoured modulation envelope is generated by the sine wave generator 24. Proceeding to step 46, methodology 40 smoothly modulates the pulsed electrical signal within the modulation envelope to produce the modulated IDRIVE signal as shown in FIG. 4.

Proceeding to step 48, methodology 40 generates a transducer DRIVE signal with transmit circuitry of the transmit/receive circuit 18. The transducer DRIVE signal as shown in FIG. 5 includes smoothly amplitude modulated ultrasonic signal that are applied as an input to the ultrasonic transducer 12 to produce and transmit ultrasonic sound waves. The biased sine contoured envelope of the DRIVE signal controls the driving signal to increase the signal amplitude from a low magnitude of about zero volts to the maximum magnitude and then back to a low amplitude. Consequently, the ultrasonic transducer is controllably driven such that it is gradually accelerated and decelerated, so that no abrupt air acceleration is present in front of the transducer. By smoothly modulating the transducer drive signal applied to the ultrasonic transducer, it has been discovered that any audible "tick" noise is effectively removed or eliminated.

Proceeding to step 52, methodology 40 further includes the step of receiving the reflected "echo" ultrasonic sound waves returned from any target objects in the path of the transmitted ultrasonic sound waves. The received reflected echo sound waves are converted to an electrical signal by the ultrasonic transducer 12 as provided in step 54. In step 56, the converted electrical signal is amplified by amplifier 20 to produce the ECHO' signal as shown in FIG. 6, and is applied to processor 22 which generates the ECHO signal and further processes the drive and echo signals to obtain time and distance information to the detected target, as provided in step 58. By monitoring the measured time period between the transmitted and received sound waves, the ultrasonic ranging system 10 can compute the distance from the ultrasonic transducer 12 to the detected target object as a function of the measured time period and the speed of travel of the ultrasonic sound waves.

Figure 8:
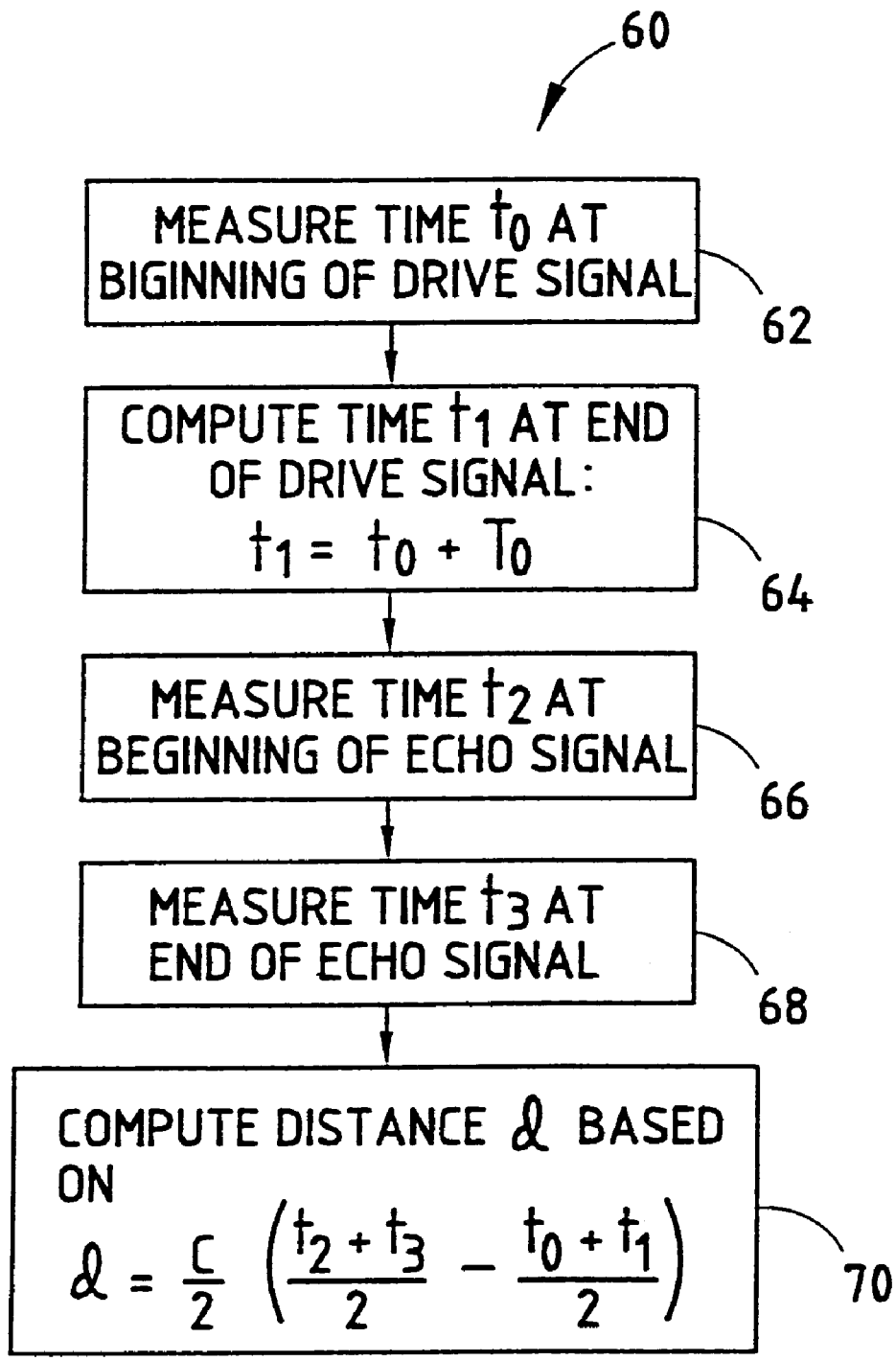
FIG. 8 is a flow diagram illustrating a method for determining distance to a target with the ultrasonic ranging system according to the present invention.

Referring to FIG. 8, a methodology 60 is provided for determining the distance from the ultrasonic transducer 12 to a detected target in an accurate manner by processing the transmitted and received signals 34 and 36 of the ECHO signal shown in FIG. 7. Methodology 60 includes the step of measuring time to at the beginning of the transmitted drive signal 34 as provided in step 62. Next, in step 64, methodology 60 computes the time $t_1$ at the end of the transmitted drive signal 34 as $t_1=t_0+T_0$, where $T_0$ is the time period of the sine envelope. Time $t_1$ could be determined by a calibration test to further improve the accuracy. In step 66, time $t_2$ is measured at the beginning of the received echo signal 36. In step 68, time $t_3$ is measured at the end of the received echo signal 36. The time period from time $t_0$ to time $t_1$ defines the time period of the transmitted drive signal 34, while the time period from time $t_2$ to time $t_3$ defines the time period of the received echo signal 36. According to the present invention, the middle time value for each of the transmitted drive signal 34 and the received echo signal 36 is determined and used to obtain an overall time period $T_P$ measurement for the ultrasonic sound waves to reach a target and reflect back to the transducer for use in determining the distance measurement to the target. More specifically, given time values $t_0$ through $t_3$, methodology 60 proceeds to step 70 to compute the distance to the detected target based on the following equation:

$$\text{Distance} = \frac{C}{2}\left[\frac{t_2+t_3}{2} - \frac{t_0+t_1}{2}\right],$$

where C represents the speed of the ultrasonic sound waves, which is generally equal to approximately 340 m/sec. Accordingly, the distance measurement is determined by computing the middle time value of the received echo signal 36, computing the middle time value of the transmitted drive signal 34, taking the time difference between the two middle time values to obtain time period $T_P$, and multiplying the time period $T_P$ by one-half the speed of travel of the sound waves (C) to provide for an accurate distance measurement to the detected target.

The aforementioned distance measurement provides for increased distance sensing accuracy, and allows for utilization of various transducer driving signals. The distance measurement further provides for the possibility of increasing the width of the transducer drive signal, which may be advantageous in some current and future applications.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of measuring distance to a target using ultrasonic sound waves, said method comprising the steps of:

generating an electrical drive signal having a series of signal pulses at an ultrasonic frequency;

applying said drive signal as an input to an ultrasonic transducer to produce ultrasonic sound waves;

transmitting said ultrasonic sound waves in a desired transmission path;

receiving ultrasonic sound waves reflected from a target in the transmission path of said transmitted sound waves;

converting said received reflected sound waves to an electrical signal;

determining a middle time value of the drive signal;

determining a middle time value of the received electrical signal;

determining a time period from the middle time value of the received electrical signal to the middle time value of the drive signal; and determining distance to the target as a function of one-half of said time period and speed of travel of said ultrasonic sound waves.

2. The method as defined in claim 1, wherein the step of determining a middle time value of the drive signal includes computing the time value midway between the beginning of the drive signal and the end of the drive signal.

3. The method as defined in claim 2, wherein the step of determining a middle time value of the received electrical signal includes computing the time midway between the beginning of the received electrical signal and the end of the received electrical signal.

4. The method as defined in claim 1, wherein the distance to said target is computed as one-half the speed of travel of the ultrasonic sound waves multiplied by the determined time period.

5. The method as defined in claim 1, wherein said drive signal comprises a series of amplitude modulated signal pulses.

6. The method as defined in claim 1 further comprising the step of amplifying said received electrical signal.

7. An ultrasonic ranging system comprising:

a drive signal generator for producing an electrical drive signal having a series of signal pulses at an ultrasonic frequency;

an ultrasonic transducer for converting said electrical drive signal to ultrasonic sound waves and for transmitting said ultrasonic sound waves in a desired transmission path, said ultrasonic transducer further receiving ultrasonic sound waves reflected from a target in said transmission path and converting said received reflected sound waves to an electrical signal; and a processor for processing said drive signal and said received electrical signal and producing a distance measurement to said target, wherein said processor computes a middle time value of said drive signal and a middle time value of said received electrical signal and determines a time period between said middle time values, and computes the distance measurement as a function of said time period.

8. The ultrasonic ranging system as defined in claim 7, wherein said processor computes said distance measurement by multiplying said determined time period by one-half the speed of travel of said ultrasonic sound waves.

9. The ultrasonic ranging system as defined in claim 7, wherein said processor computes said middle time value of said drive signal by computing the time value midway between the beginning and the end of the drive signal.

10. The ultrasonic ranging system as defined in claim 7, wherein said processor determines the middle time value of said received signal by computing the time value midway between the beginning and end of the received signal.

11. The ultrasonic ranging system as defined in claim 7 further comprising an amplitude modulator for amplitude modulating said drive signal so that said series of signal pulses varies in amplitude.

12. The ultrasonic ranging system as defined in claim 11, wherein said modulator provides a smooth modulation envelope that varies in amplitude.

13. The ultrasonic ranging system as defined in claim 7 further comprising a transceiver for transmitting said drive signal to said ultrasonic transducer and for receiving said converted electrical signal therefrom.

* * * * *